July 15, 1930. F. CREIGHTON Re. 17,730
WINDSHIELD CLEANER
Original Filed Feb. 7, 1923
Fig. 1,
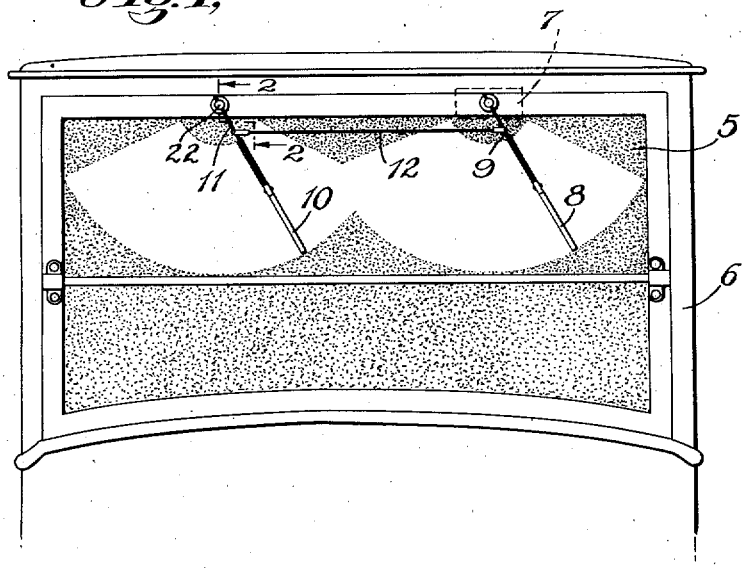
Fig. 2,
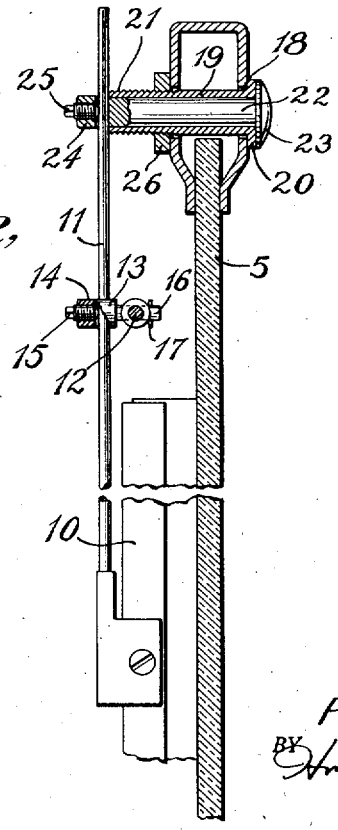
INVENTOR.
Fred. Creighton
BY Howard E. Thompson
ATTORNEY.

Reissued July 15, 1930

Re. 17,730

UNITED STATES PATENT OFFICE

FRED CREIGHTON, OF PATCHOGUE, NEW YORK

WINDSHIELD CLEANER

Original No. 1,699,049, dated January 15, 1929, Serial No. 617,460, filed February 7, 1923.
Application for reissue filed November 5, 1929. Serial No. 405,012.

This invention relates to windshield cleaners and particularly to dual devices of this class which may be automatically or manually operated, and the object of the invention is to provide a windshield wiping or cleaning construction employing two separate wiping or cleaning elements, both of which may be positively operated, or one of which may be operated and the other coupled or linked with the first and operated therethrough; and with these and other objects in view the invention consists in a device of the class and for the purpose specified which is simple in construction and operation, efficient in use and which is constructed and operated as hereinafter described and claimed.

The invention is fully disclosed in the following specification, of which the accompanying drawing forms a part, in which the separate parts of my improvement are designated by suitable reference characters in each of the views, and in which:

Fig. 1 is a front view of the windshield of a motor vehicle showing one form of my improved construction mounted in connection therewith and indicating the method of its use; and Fig. 2 a partial section on the line 2—2 of Fig. 1 on an enlarged scale and with parts of the construction broken away.

In Fig. 1 of the drawing I have shown for the purpose of illustrating one use of my invention, the windshield 5 of a motor vehicle 6 and at 7 I have indicated a pneumatically, mechanically or electrically actuated device for operating a windshield wiper 8 which wiper is directly connected with the device 7. This structure is common and well known in the art, and my invention as shown in Fig. 1 consists in coupling with the wiper 8 or the oscillating shaft 9 thereof a supplemental wiper 10, the shaft 11 of which is joined to the shaft 9 by a connecting rod 12, the ends of said rod being pivoted to the oscillating shafts 9 and 11 by pivotal connections 13 shown in detail in Fig. 2 of the drawing and comprising parts 14 through which the shafts 9 and 11 pass, said parts being keyed to said shafts by set screws 15, and the parts 14 are provided with projecting pins 16 which are passed through apertures on the ends of the rod 12, said rod being held against displacement on the pins 16 by cotter pins 17.

In carrying my invention into effect I provide an aperture 18 in the top frame member of the windshield 5 at a predetermined distance from the device 7 and pass through said aperture a sleeve 19, the inner end of which is provided with a head 20, the outer end portion of which is externally threaded as shown at 21. Mounted in the sleeve 19 is a pin 22 the head 23 of which rests on the head 20, and the outer end of the pin 22 projects beyond the end of the sleeve 19 and is provided with an aperture 24 through which the shaft 11 passes, and said shaft is held in a predetermined position in connection with the pin 22 by a set screw 25. Mounted on the threaded portion of the sleeve 19 is a lock nut 26 which serves to retain said sleeve in rigid connection with the top frame of the windshield.

With the above described construction it will be apparent that by properly positioning the supplemetal wiper 10 or the fulcrum thereof as well as properly positioning the first named or main wiper 8, or its fulcrum and also by actuating the first named wiper 8 through any mechanical device, such as commonly known, both of the wipers will travel in a path such as indicated in Fig. 1 of the drawing to clean or wipe the outer surface of a windshield by reason of the linking of the separate wipers 8 and 10 through the rod 12. By keeping a windshield clean, or by wiping the same in the manner shown and described, the operator of the vehicle has a clear vision of practically the entire width of the windshield which enables the operator to see both sides of the road and all traffic in front of or at the sides of the vehicle operated by such operator.

In assembling my supplemental or auxiliary wiper unit and assuming that the pivot for the arm of the main wiper 8 as well as the pivot 22 for the supplemental wiper have been secured and attached to the windshield frame, the couplings 13 pivoted to the ends of the connecting rod 12 are passed onto the free ends of the arms 9 and 11 of the wipers 8 and 10 and moved longitudinally thereof into the desired position and fixed or clamped in such position by the set screws 15, after which the arms 9 and 11 are connected with their respective pivots. The connection with the pivot 22 is made by the set screw 25. From the foregoing, it will be apparent that the rod 12 may be attached and detached from the arms 9—11 whenever desired after removing said arms from their pivotal supports and the connecting or attaching parts 13 including their set screws 15 facilitate the quick attachment and detachment of the connecting rod with the arms of the wiper elements.

It will be understood that while I have shown a method of carrying my invention into effect, that I am not necessarily limited to the details of construction herein shown and described, nor the specific method of operating dual wipers herein set out, and any means may be employed, either manually, mechanically, or otherwise for imparting movement to dual wipers mounted at spaced intervals on a windshield and adapted to clear or clean as near as possible the entire transverse area of the shield, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. In a windshield wiping mechanism of the class described, a wiper unit adapted to be mounted in connection with a windshield and to be coupled with and operated by another wiper mounted in connection with said windshield, said unit comprising a wiper element, means adjustably mounted on one end portion of said element for pivotally mounting the same in connection with the windshield, and a coupling rod, one end portion of which is adjustably and pivotally mounted on said elements between the pivot and wiper ends thereof.

2. A windshield wiper unit adapted to be coupled with and operated by a wiper mounted in connection with a windshield, said unit comprising a wiper body, an arm extending in substantial parallelism with reference to said body and projecting therebeyond, means adjustably fixed to the free end portion of said arm for pivotally mounting the same in connection with a windshield, a coupling rod, means at one end portion of said coupling rod for adjustably and pivotally coupling said rod with said arm between the pivot end portion thereof and the wiper body thereon, and means at the other end portion of said coupling rod for detachably and pivotally mounting the same in connection with another wiper.

3. A windshield cleaning mechanism comprising in combination a plurality of independent cleaning elements, supporting arms for said elements, means whereby said arms may be pivotally connected with a windshield, and a connecting attachment including a rod having pivotal connections with said supporting arms at points intermediate their pivotally connected ends and said cleaning elements, whereby the operation of one of said cleaners will cause corresponding movements to be imparted to each, the pivotal connection between each end of said rod and the arm to which it is connected being readily adjustable lengthwise along said arm.

4. A connecting device for independently mounted cleaning elements having supporting arms, comprising a connecting member for reaching between said supporting arms, and an attaching part pivotally mounted on each end of said connecting member and said part being movable longitudinally of the arm of one of said cleaning elements and provided with means for detachably engaging the arm of said element.

5. A windshield cleaning mechanism comprising in combination, a plurality of independent cleaning elements, supporting arms for said elements, pivot means for supporting said arms in connection with a windshield, means on said first named means through which said arms are adapted to pass for detachably supporting the arms in connection therewith, and a connecting attachment comprising a rod, and an attaching part pivotally mounted on each end of said rod and adapted to be detachably clamped upon said supporting arms at points intermediate their pivotally connected ends and said cleaning elements, by sliding movement of said parts and arms with respect to each other, said connecting attachment coupling the arms of said elements, whereby the operation of one of said elements will cause corresponding movement to be imparted to the other element.

In testimony that I claim the foregoing as my invention, I have signed my name this 1st day of November, 1929.

FRED CREIGHTON.